(12) United States Patent
Liu

(10) Patent No.: US 9,877,517 B2
(45) Date of Patent: Jan. 30, 2018

(54) ELECTRONIC CIGARETTE AND ELECTRONIC HOOKAH

(71) Applicant: HUIZHOU KIMREE TECHNOLOGY CO., LTD, Huizhou, Guangdong (CN)

(72) Inventor: Qiuming Liu, Guangdong (CN)

(73) Assignee: HUIZHOU KIMREE TECHNOLOGY CO., LTD. SHENZHEN BRANCH, Shenzhen, Guangdong (CN)

( * ) Notice: Subject to any disclaimer, the term of this patent is extended or adjusted under 35 U.S.C. 154(b) by 91 days.

(21) Appl. No.: 15/067,642

(22) Filed: Mar. 11, 2016

(65) Prior Publication Data
US 2016/0192709 A1    Jul. 7, 2016

Related U.S. Application Data

(63) Continuation of application No. PCT/CN2014/092261, filed on Nov. 26, 2014.

(51) Int. Cl.
*H05B 3/14* (2006.01)
*A24F 47/00* (2006.01)
(Continued)

(52) U.S. Cl.
CPC .............. *A24F 47/008* (2013.01); *A24F 1/30* (2013.01); *G05B 15/02* (2013.01); *G06F 3/0416* (2013.01);
(Continued)

(58) Field of Classification Search
CPC ........ A24F 47/008; A24F 47/002; A24F 7/00; A24F 15/12; A24F 15/18; A24F 15/20;
(Continued)

(56) References Cited

U.S. PATENT DOCUMENTS 8,371,709 B2 * 2/2013 Cheng ...................... B60N 3/14
219/267
8,499,766 B1 * 8/2013 Newton ................ A24F 47/002
131/273

(Continued)

FOREIGN PATENT DOCUMENTS

CN         203646511 U     6/2014
CN         203692553 U     7/2014

(Continued)

OTHER PUBLICATIONS

International Search Report for PCT/CN2014/092261, dated Sep. 9, 2015, ISA/CN.

*Primary Examiner* — Truc Nguyen
(74) *Attorney, Agent, or Firm* — U.S. Fairsky LLP; Yue Xu

(57) ABSTRACT

An electronic cigarette includes a first housing and a second housing detachably connected to the first housing. A battery and a controller are provided in the first housing. A first electrode assembly and a light-emitting unit electrically connected with the controller are provided at an end of the first housing. A smoke vent inserted into and cooperating with the smoke device for water storage is provided at an end of the second housing away from the first housing. At least two atomizers arranged coaxially are detachably inserted into the second housing. Since multiple atomizers are provided coaxially, the amount of smoke atomized by the electronic cigarette is increased effectively. When the light-emitting unit is working, the user can check the remaining amount of cigarette liquid in the electronic cigarette at any time. An electronic hookah is further provided.

20 Claims, 4 Drawing Sheets

(51) Int. Cl.
*A24F 1/30* (2006.01)
*G05B 15/02* (2006.01)
*G06F 3/041* (2006.01)
*H05B 3/00* (2006.01)
*H05B 3/03* (2006.01)
*H05B 3/40* (2006.01)

(52) U.S. Cl.
CPC .............. *H05B 3/0014* (2013.01); *H05B 3/03* (2013.01); *H05B 3/40* (2013.01)

(58) Field of Classification Search
CPC ... A24F 7/02; H05B 1/0244; H05B 2203/021; H05B 2203/014; H05B 2203/022; H05B 3/44; H05B 3/03; H05B 3/04; H05B 3/40
See application file for complete search history.

(56) References Cited

U.S. PATENT DOCUMENTS

| | | | | |
|---|---|---|---|---|
| 9,497,995 | B2* | 11/2016 | Liu | A24F 47/008 |
| 9,510,624 | B2* | 12/2016 | Li | A61M 11/041 |
| 9,635,886 | B2* | 5/2017 | Tu | A24F 47/008 |
| 9,723,877 | B2* | 8/2017 | Wong | A24F 47/008 |
| 2013/0192615 | A1* | 8/2013 | Tucker | H01C 17/00 |
| | | | | 131/328 |
| 2014/0345635 | A1* | 11/2014 | Rabinowitz | A24B 15/16 |
| | | | | 131/352 |
| 2015/0114411 | A1* | 4/2015 | Buchberger | A61M 11/041 |
| | | | | 131/329 |
| 2015/0245658 | A1* | 9/2015 | Worm | A24F 47/008 |
| | | | | 131/328 |
| 2015/0257447 | A1* | 9/2015 | Sullivan | A24F 47/008 |
| | | | | 131/329 |
| 2015/0374039 | A1* | 12/2015 | Zhu | A24F 47/008 |
| | | | | 131/329 |
| 2016/0007654 | A1* | 1/2016 | Zhu | A24F 47/008 |
| | | | | 131/328 |
| 2016/0015083 | A1* | 1/2016 | Castillo | A24F 47/008 |
| | | | | 131/329 |
| 2016/0058073 | A1* | 3/2016 | Chen | A24F 47/008 |
| | | | | 131/329 |
| 2016/0157522 | A1* | 6/2016 | Zhu | F01K 5/00 |
| | | | | 131/329 |
| 2016/0192708 | A1* | 7/2016 | DeMeritt | H05B 3/40 |
| | | | | 131/329 |

FOREIGN PATENT DOCUMENTS

| | | |
|---|---|---|
| CN | 203873001 U | 10/2014 |
| JP | 2010213579 A | 9/2010 |

* cited by examiner

ELECTRONIC CIGARETTE AND ELECTRONIC HOOKAH

CROSS-REFERENCE TO RELATED APPLICATIONS

This application is a continuation of International Application No. PCT/CN2014/092261, titled "ELECTRONIC CIGARETTE AND ELECTRONIC HOOKAH", filed on Nov. 26, 2014, the entire disclose of which is incorporated herein by this reference.

TECHNICAL FIELD

The present application relates to the technical field of electronic cigarettes, and in particular to an electronic cigarette and an electronic hookah.

BACKGROUND

It is well-known that electronic cigarettes emerge in the market for replacing conventional cigarettes and become more and more popular. Existing electronic cigarettes, however, have many disadvantages. For example, an existing electronic cigarette imitates a conventional cigarette and has a same length, thus the amount of cigarette liquid stored in the electronic cigarette is limited, and users have to replace liquid storage device or refill cigarette liquid frequently, causing inconvenience to users, further, the amount of smoke atomized by the electronic cigarette is unable to meet the requirements of users. Secondly, users are unable to obtain the information, such as, the remaining amount of the cigarette liquid, the operating power of the electronic cigarette, and dump energy through the existing electronic cigarette. Thirdly, a glass fiber line is disposed on the existing electronic cigarette and an electric heating wire is disposed on the glass fiber line, thus the electric heating wire atomizes cigarette liquid to generate smoke when being energized, therefore, the glass fiber line may be burned to a certain degree in the operation of the electric heating wire, forming fine chips, and those fine chips may be sucked in by users when they sucking the electronic cigarette, thus there will be a bad effect on smoking taste and users' health. Finally, users may be apt to suck cigarette liquid stored in the electronic cigarette or cigarette liquid formed with condensed smoke in when using the conventional electronic cigarette, thereby affecting the smoking taste and users' health.

SUMMARY

An electronic cigarette and an electronic hookah are provided by the present application.

An electronic cigarette configured to be inserted into and cooperate with a water storage smoking device to atomize cigarette liquid for smoking by users, including: an outer housing, wherein the outer housing includes a first housing and a second housing detachably connected to the first housing, the cross-sectional area of an end face of the first housing away from the second housing is larger than the cross-sectional area of the second housing;

a battery and a controller electrically connected to the battery are provided in the first housing, and a first electrode assembly and a light-emitting unit electrically connected with the controller are provided at an end of the first housing facing the second housing, and light enters into the second housing and penetrates the second housing to an outer surface of the electronic cigarette when the light-emitting unit is working, a touch-controlling display module is provided at an end face of the first housing facing away from the second housing, the touch-controlling display module is electrically connected to the controller for displaying information of the electronic cigarette to allow users to control the operation of the electronic cigarette;

a smoke vent, which is inserted into and cooperates with the smoke device for water storage, is provided at an end of the second housing away from the first housing, and at least two atomizers arranged coaxially are detachably inserted into the second housing, any two adjacent atomizers of the atomizers are connected detachably, and a target atomizer is detachably connected to the first electrode assembly, the target atomizer is one of the atomizers closest to the first battery rod assembly;

the atomizer includes a liquid storage assembly, a second electrode assembly inserted in either end of the liquid storage assembly and an electric heating wire assembly inserted in the liquid storage assembly for atomizing cigarette liquid in the liquid storage assembly; the second electrode assembly of the target atomizer is electrically connected to the first electrode assembly, and the electric heating wire assembly is electrically connected to the second electrode assembly.

Preferably, the liquid storage assembly includes: a light-transmittable liquid storage cartridge and an atomizing tube inserted in the liquid storage cartridge, and a liquid storage chamber for storing cigarette liquid is enclosed by the liquid storage cartridge, the atomizing tube and the second electrode assembly, and a liquid inlet is provided an end of the atomizing tube away from the first housing at a position where the end is connected to an end wall of the liquid storage chamber, the liquid storage chamber is in communication with an inner chamber of the atomizing tube by the liquid inlet;

the electric heating wire assembly is arranged in the atomizing tube and acquires cigarette liquid from the liquid inlet for atomization.

Preferably, the liquid storage assembly further includes a fixing tube and an atomizing ring inserted in the atomizing tube, a cigarette liquid buffering space is formed between the atomizing ring and the liquid inlet;

the electric heating wire assembly includes a wick supported on the fixing tube and extending into the cigarette liquid buffering space, and an electric heating wire wound on the wick for atomizing cigarette liquid on the wick, and the atomizing ring is sleeved on the atomizing tube and clamps on the wick, an outer peripheral surface of the atomizing ring elastically abuts against an inner peripheral surface of the atomizing tube.

Preferably, two ends of the fixing tube are inserted into the second electrode assembly respectively, and the fixing tube is woven from glass fiber strands.

Preferably, a liquid filling port in communication with the liquid storage chamber and a sealing member configured to seal the liquid filling port are provided at an end face of the atomizer.

Preferably, an elastic sealing layer is provided on an inner circumferential wall of the smoke vent, such that the smoke vent abuts the water storage smoking device through the elastic sealing layer.

Preferably, multiple elastic protrusions are formed on an inner circumferential wall of the elastic sealing layer at intervals in a direction towards the water storage smoking device.

Preferably, a threaded structure is formed on the inner circumferential wall of the elastic sealing layer.

Preferably, a hollow portion of the fixing tube is in communication with a hollow portion of the second electrode assembly so as to form a smoke passageway for passing through the smoke; and the smoke passageway is in communication with the smoke vent.

Preferably, a first threaded section is provided on an end face of the first housing facing the second housing; and a second threaded section matched with the first threaded section is provided on an inner peripheral surface of an end of the second housing facing the first housing, such that the second housing is connected to the first housing by the first threaded section and the second threaded section matched with each other.

Preferably, a guide groove is provided at an end face of the first housing facing the second housing, and a stuck groove is provided for being in communication with the guide groove;

a sliding catch inserted in the guide groove and slidable along the guide groove is provided at an inner peripheral surface of an end of the second housing facing the first housing, and if the sliding catch slides into the struck groove along the guide groove, the second housing is securely connected to the first housing.

An electronic hookah includes a water storage smoking device, which is provided with a smoke inlet and a smoke outlet, and the water storage smoking device is placed vertically in use and the smoke inlet is located at an upper end of the water storage smoking device, and the electronic hookah further includes an electronic cigarette according to any one of above items, the smoke vent of the electronic cigarette is in communication with the smoke inlet, and when a user is smoking, smoke generated by the electronic cigarette is discharged from the smoke outlet after being filtered by water in the water storage smoking device.

Preferably, a smoking tube is mounted at the smoke inlet of the water storage smoking device, and the smoking tube is inserted in the smoke vent of the electronic cigarette, such that the smoking tube is configured to be in communication with the smoke vent.

Preferably, one or more smoke outlet is provided.

The present application provides an electronic cigarette and an electronic hookah. The electronic cigarette includes an outer housing. The outer housing includes a first housing and a second housing detachably connected to the first housing. A battery and a controller electrically connected to the battery are provided in the first housing, and a first electrode assembly and a light-emitting unit electrically connected with the controller are provided at an end of the first housing facing the second housing, and a smoke vent being inserted into and cooperating with the smoke device for water storage is provided at an end of the second housing away from the first housing, and at least two atomizers arranged coaxially are detachably inserted into the second housing, any two adjacent atomizers of the atomizers are connected detachably. Since multiple atomizers detachably connected with each other are provided coaxially in the present application, the amount of smoke atomized by the electronic cigarette is increased effectively, and it is easy for users to adjust the taste of cigarette liquid by themselves through the cooperation of different atomizers; the amount of smoke for requirements of different users can be adjusted by increasing and decreasing the number of the atomizers, thus meeting usage requirements of the users; since the second housing is detachably connected to the first housing and the multiple atomizers are detachably connected and provided in the second housing and connected to the first electrode assembly, the connection between the atomizers is difficult to become loose in vibration, and the electrical connection is more stable, and it is easy to bring the atomizer out or place the atomizer; and the second housing is made of transparent material, light enters into the second housing and penetrates the second housing to an outer surface of the electronic cigarette when the light-emitting unit is working, such that the user can observe the remaining amount of cigarette liquid in the electronic cigarette at any time through the light penetrating to the outer surface of the electronic cigarette and the light-transmittable second housing, thereby how long the electrical cigarette can be used may be substantially determined, which can be used for determining whether to refill the cigarette liquid or not, thus avoiding that the electronic cigarette cannot be used due to an insufficient amount of stored cigarette liquid. A touch-controlling display module is provided at an end face of the first housing facing away from the second housing, and the touch-controlling display module is electrically connected to the controller for displaying information of the electronic cigarette to allow users to control the operation of the electronic cigarette; the touch-controlling display module can receive touch operations from users, when it is detected that user touches the touch-controlling display module to input operational order by the controller, the controller can correspondingly control the electronic cigarette to atomize cigarette liquid so as to form smoke; or calculate the remaining times that the user can suck based on the remaining amount of cigarette liquid stored in the electronic cigarette, and display the calculated the remaining times through the touch-controlling display module; or display information, such as the power, voltage of the battery, and how long the power will be off; since the cross-sectional area of an end face of the first housing away from the second housing is larger than the cross-sectional area of second housing, it facilitates the operation of a touch-controlled display module, and effectively avoids the electronic cigarette dropping out of a hand of a user when he picking or placing the electronic cigarette at the water storage smoking device, thereby facilitating the usage; other impurities generated in the operation of the electronic cigarette can be filtered effectively by the water storage smoking device, thus smoking taste can be improved and users' health can be protected effectively.

DETAILED DESCRIPTION

A first embodiment is provided, in which an electronic cigarette may effectively improve and adjust amount of smoke so as to adjust taste of cigarette liquid.

The electronic cigarette according to the present embodiment is inserted into and cooperates with a water storage smoking device to atomize cigarette liquid for smoking by users. That is, the smoke atomized by the electronic cigarette of the present embodiment can be sucked by users after being filtered by the water storage smoking device. It is advantageous to employ this arrangement that cigarette liquid stored within the electronic cigarette and cigarette liquid formed with condensed smoke can be effectively prevented from sucking by users through filtration via the water storage smoking device. Moreover, other impurities generated in the operation of the electronic cigarette can also be filtered effectively via the water storage smoking device, thus smoking taste can be improved and users' health can be protected effectively.

Figure 1:
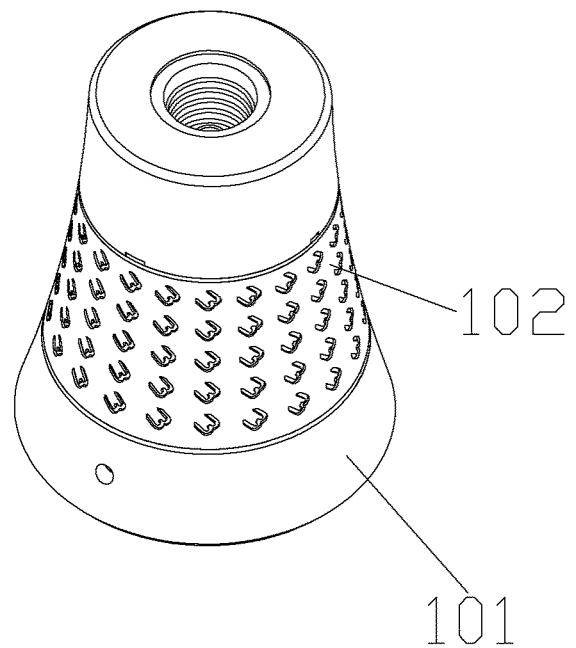
FIG. 1 is a schematic view of the overall structure of an electronic cigarette according to a preferred embodiment of the present application.
Figure 2:
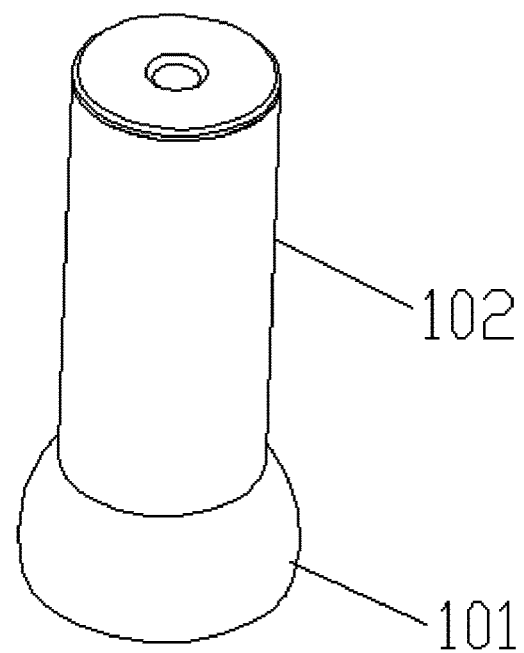
FIG. 2 is a schematic view of the overall structure of an electronic cigarette according to another preferred embodiment of the present application.

As shown in FIGS. 1 and 2, the electronic cigarette includes:

an outer housing, which includes a first housing 101 and a second housing 102 detachably connected to the first housing 101;

wherein the cross-sectional area of an end face of the first housing 101 away from the second housing 102 is larger in than the cross-sectional area of the second housing 102.

Preferably, as show in FIG. 1, the cross-sectional area of the first housing 101 is gradually increased in a direction away from the second housing 102.

Preferably, as shown in FIG. 2, the first housing 101 is generally in a circular truncated cone shape, and the cross-sectional area of the first housing 101 in a radial direction of the electronic cigarette is larger than the cross-sectional area of the second housing 102.

Since the cross-sectional area of the end face of the first housing 101 away from the second housing 102 is larger than the cross-sectional area of the second housing 102, the first housing 101 can be stably connected to the second housing 102, and when each means is placed into the first housing 101, a longitudinal length of the first housing 101 can be effectively reduced, facilitating the operation by users. Furthermore, this also allow a touch-controlled display module to be operated conveniently, and effectively avoids the electronic cigarette dropping from a hand of a user when he picking or placing the electronic cigarette at the water storage smoking device, facilitating the operation by the user.

It should be noted that the shape of the whole electronic cigarette is not limited by the present embodiment. FIGS. 1 and 2 are just used for illustration by way of example and not for limitation, as long as the first housing 101 and the second housing 102 are arranged coaxially, and the cross-sectional area of the end face of the first housing 101 away from the second housing 102 is larger than the cross-sectional area of the second housing 102.

Figure 3:
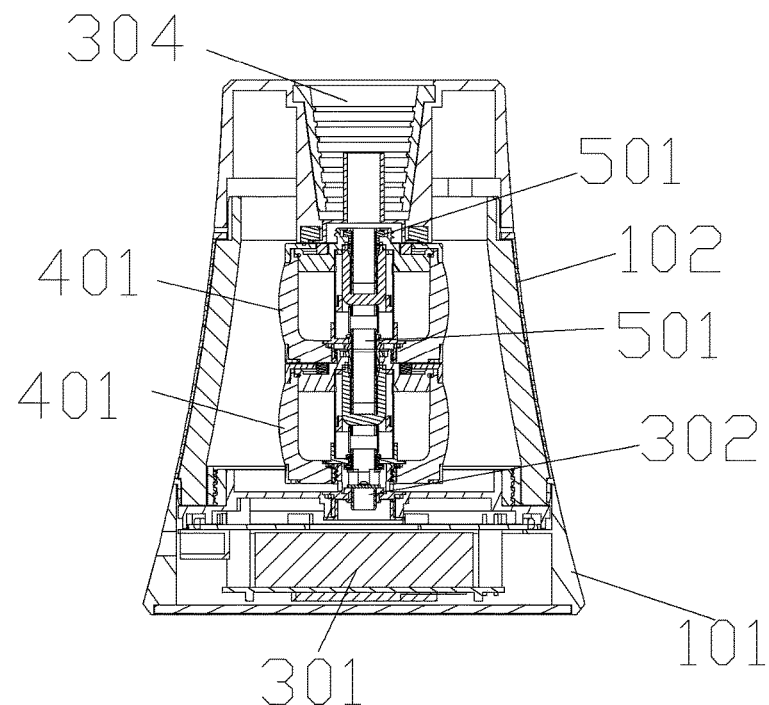
FIG. 3 is a sectional schematic view of the structure of the electronic cigarette according to the preferred embodiment shown in FIG. 1.

Further, the internal structure of the electronic cigarette will be described in detail in conjunction with FIGS. 3 and 4. FIG. 3 is a schematic view of the sectional structure of the electronic cigarette shown in FIG. 1, and FIG. 4 is an exploded view of the connection structure of the electronic cigarette according to the preferred embodiment shown in FIG. 1.

It should be noted that the difference between the electronic cigarettes shown in FIGS. 1 and 2 only lies in shape. Since the electronic cigarettes shown in FIGS. 1 and 2 have the same internal structure, the internal structure of the electronic cigarette shown in FIG. 2 will not be described.

As shown in FIG. 3, a battery 301 and a controller electrically connected to the battery 301 are provided in the first housing 101.

Figure 4:
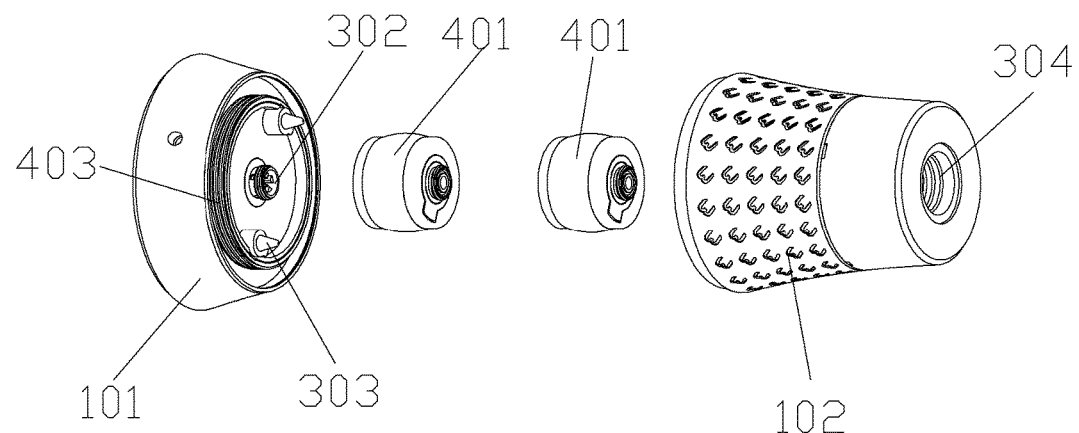
FIG. 4 is an exploded view of the electronic cigarette according to the preferred embodiment shown in FIG. 1.

As shown in FIGS. 3 and 4, a first electrode assembly 302 and a light-emitting unit electrically connected with the controller are provided at the end of the first housing 101 facing the second housing 102.

The specific position where the light-emitting unit is located is not limited by the present embodiment, as long as the light-emitting unit is electrically connected to the controller and is located in the first housing 101.

Preferably, the second housing 102 of the present embodiment is made of light-transmittable material. The degree of light transmittance of the second housing 102 is not limited by the present embodiment, for example, the second housing 102 may be a transparent housing, partially transparent housing or semitransparent housing.

The light-emitting unit may emit light by the controller. Specifically, the light-emitting unit is configured to emit light when it is determined that the user is smoking by the controller. More specifically, the light-emitting unit is configured to emit light continuously or flash up with a certain frequency, which simulates the light emitting effect of a real cigarette.

Preferably, the second housing 102 is made of transparent material. Light enters into the second housing 102 and is able to penetrate the second housing 102 to the outer side of the electronic cigarette when the light-emitting unit is working, such that the user can check the remaining amount of cigarette liquid in the electronic cigarette at any time through the light penetrating to the outer surface of the electronic cigarette and the light-transmittable second housing 102, thereby how long the electronic cigarette can be used can be determined substantially, thus, whether it needs to refill the cigarette liquid can be determined. Therefore, the electronic cigarette is avoided being unable to be used due to a shortage of cigarette liquid stored in the electronic cigarette.

A touch-controlling display module is provided at the end face of the first housing 101 facing away from the second housing 102. The touch-controlling display module is electrically connected to the controller for displaying information of the electronic cigarette to allow users to control the operation of the electronic cigarette.

The touch-controlling display module can receive touch operations from users. If it is detected that a user touches the touch-controlling display module to input operational order by the controller, the controller can correspondingly control the electronic cigarette to atomize cigarette liquid so as to form smoke; or calculate the remaining times that the user can suck based on the remaining amount of cigarette liquid stored in the electronic cigarette, and display the calculated remaining times through the touch-controlling display module; or display information, such as the power, voltage of the battery 301, and how long the power will be off. It should be noted that specific function realized by the touch-controlling display module is not limited by the present embodiment.

Further, as shown in FIG. 4, multiple airflow sensors 303 may be provided at the end of the first housing 101 facing the second housing 102. It should be noted that the airflow sensor s 303 of the present embodiment are optional. If the user can input an operational order for smoking through the touch-controlling display module, there is no need to provide the airflow sensors 303.

Specifically, each of the airflow sensors 303 is electrically connected to the controller such that the airflow sensor 303 may generate a trigger signal correspondingly while sensing an action of smoking by users, and thus the controller can control the electronic cigarette to atomize cigarette liquid so as to form smoke based on the trigger signal.

A smoke vent 304 is inserted into and cooperates with the smoke device for water storage and is provided at the end of the second housing 102 away from the first housing 101, and at least two atomizers 401, which are arranged coaxially, are detachably inserted into the second housing 102.

It should be noted that although two atomizers 401 are shown in FIGS. 3 and 4 for illustration by way of example, the specific number of the atomizers 401 is not limited by the present embodiment, as long as the number of the atomizers 401 is greater than or equal to two and each of the atomizers 401 is arranged coaxially along the axis of the electronic cigarette.

Although two adjacent atomizers 401 may be connected detachably, the specific way of detachable connection between the two adjacent atomizers 401 is not limited by the present embodiment, for example, the detachable connection can be a threaded connection, a snap fit connection, or a magnet connection, etc.

In the present embodiment, the atomizer 401 closest to the first battery rod assembly 302 is defined as a target atomizer. It should be noted that the target atomizer 401 is same in structure as each of the atomizers except that the target atomizer 401 is arranged closest to the first battery rod assembly 302.

The target atomizer 401 is detachably connected to the first electrode assembly 302, the target atomizer 401 may be detachably connected to the first electrode assembly 302 through a threaded section, a snap fit, or a magnet.

That is, the specific detachable connection is not limited by the present embodiment.

The advantage of the detachable connection between the atomizers 401 is that it is easy for users to replace the atomizer 401 at any time and refill the cigarette liquid into the atomizer 401, thus effectively increasing the service life of the electronic cigarette, and saving the cost for users in the subsequent usage of the electronic cigarette. Furthermore, it is easy for users to adjust the taste of cigarette liquid by themselves through matching different atomizers. The amount of smoke for different users' requirements can be adjusted by increasing and decreasing the number of the atomizers, thus satisfying usage requirements for users. Specifically, the adjustment to the number of the atomizers can be realized by providing a combination of multiple atomizers with different lengths.

The specific structure of the atomizer 401 will be described in detail in conjunction with FIGS. 5 and 6.

Figure 6:
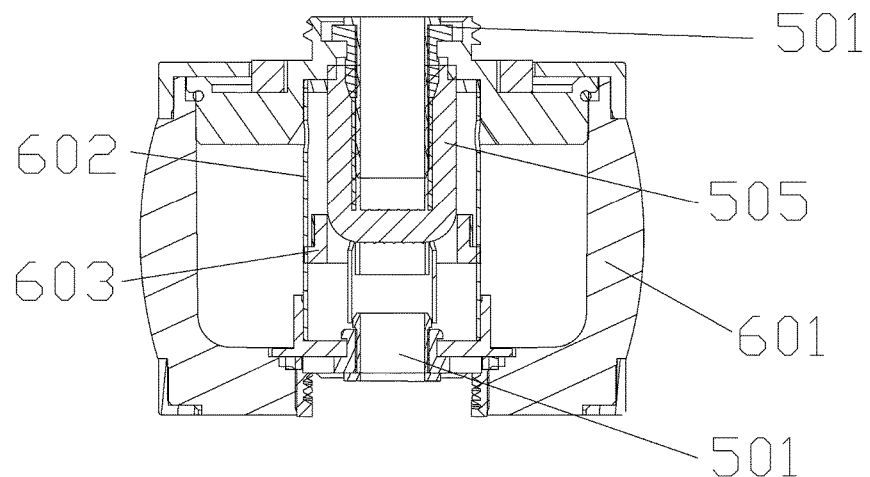
FIG. 6 is a sectional schematic view of the structure of the atomizer according to the preferred embodiment of the present application.

The atomizer 401 includes:
a liquid storage assembly;
a second electrode assembly 501 inserted into either end of the liquid storage assembly (as shown in FIG. 6);
that is, both of two ends of the atomizer 401 are respectively provided with one second electrode assembly 501.

Figure 5:
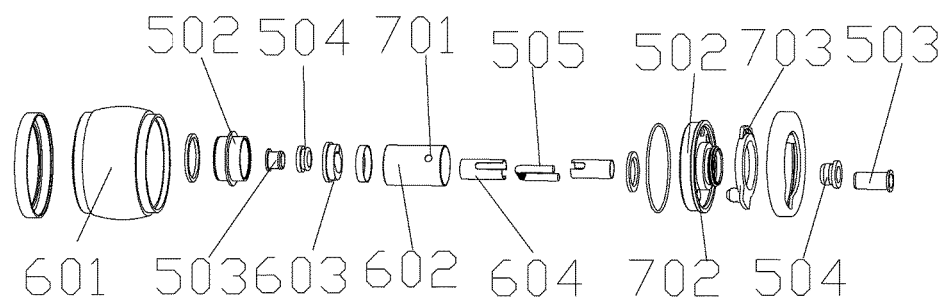
FIG. 5 is an exploded view of the structure of an atomizer according to the preferred embodiment of the present application.

Specifically, as shown in FIG. 5, the second electrode assembly 501 includes: an outer electrode 502, an inner electrode 503 inserted in the outer electrode 502, and an insulating ring 504 located between the outer electrode 502 and the inner electrode 503.

More specifically, the electrical connection between any two adjacent atomizers 401 may be realized by two adjacent second electrode assemblies 501.

The second electrode assembly of the target atomizer 401, arranged closest to the first battery rod assembly 302, is electrically connected to the first electrode assembly 302.

The atomizer 401 further includes:
an electric heating wire assembly 505 inserted in the liquid storage assembly for atomizing cigarette liquid in the liquid storage assembly, the electric heating wire assembly 505 is electrically connected to the second electrode assembly 501.

That is, the specific operation of the electronic cigarette in the present embodiment is: the airflow sensor 303 generates a trigger signal after sensing a smoking action of users. Since adjacent atomizers 401 are electrically connected by second electrode assemblies 501 detachably connected to each other and the target atomizer 401 is electrically connected to the first electrode assembly 302 by its second electrode assembly 501, the electrical connection between the battery 301 and each of the atomizers 401 is realized, and the battery 301 is configured to supply power for each of the atomizers 401 simultaneously based on the trigger signal by the controller. Thus, each of the atomizers 401 operates to atomize cigarette liquid simultaneously to form smoke, thereby the electronic cigarette of the present embodiment may effectively increase the amount of smoke and is convenient for users to operate.

A second embodiment is provided, in which the specific structure of the atomizer is further described in detail.

As shown in FIGS. 5 and 6, the liquid storage assembly includes:
a light-transmittable liquid storage cartridge 601;
an atomizing tube 602 inserted in the liquid storage cartridge 601;
wherein a liquid storage chamber for storing cigarette liquid is enclosed by the liquid storage cartridge 601, the atomizing tube 602 and the second electrode assembly 501.

Specifically, cigarette liquid is preferably stored by the liquid storage chamber in the present embodiment, thus the amount of storage for cigarette liquid can be increased, allowing a long time for using the electronic cigarette and avoiding refilling cigarette liquid frequently.

Apparently, liquid storage material that can store cigarette liquid, such as liquid storage cotton, may be placed in the liquid storage chamber, thereby preventing cigarette liquid from being delivered to the electric heating wire assembly 505 excessively, and avoiding the leakage of the cigarette liquid due to an excessive delivery of the cigarette liquid.

Reference is further made to FIG. 5. The end of the atomizing tube 602 away from the first housing 101 is provided with a liquid inlet 701 at a position where the end is connected to an end wall of the liquid storage chamber. The liquid storage chamber is in communication with the inner chamber of the atomizing tube 602 by the liquid inlet 701. With such structure, cigarette liquid in the liquid storage chamber can completely enter into the atomizing tube in the case that the electronic cigarette is placed on the smoking device for liquid storage, thus avoiding not making full use of cigarette liquid and avoiding the deteriorated cigarette liquid in the liquid storage chamber contaminating the subsequently refilled cigarette liquid.

The electric heating wire assembly 505 is arranged in the atomizing tube 602 and acquires cigarette liquid from the liquid inlet 701 for atomization.

The liquid storage assembly further includes:

an atomizing ring 603 and a fixing tube 604 inserted in the atomizing tube 602;

a cigarette liquid buffering space is formed between the atomizing ring 603 and the liquid inlet 701;

the electric heating wire assembly 505 includes a wick supported on the fixing tube 604 and extending into the cigarette liquid buffering space and further includes an electric heating wire wound on the wick for atomizing cigarette liquid on the wick, and the atomizing ring 603 is sleeved on the atomizing tube 602 and clamps on the wick.

Such arrangement is advantageous in that since the liquid buffering space is formed between the atomizing ring 603 and the liquid inlet 701, an excessive delivery of cigarette liquid to the electric heating wire can be effectively avoided, such that the amount of cigarette liquid delivered to the electric heating wire is stable and uniform, and thus the amount of smoke atomized by the electric heating wire is stable and uniform, which improves smoking taste, and avoids the leakage of cigarette liquid due to excessive cigarette liquid at the area of the electric heating wire. Since the atomizing ring 603 can clamp on the wick, the stabilization of the assembled atomizer can be improved and the electric heating wire assembly 505 can be avoided falling off in the use of the electronic cigarette, thus allowing the normal operation of the electronic cigarette and increasing service life of the electronic cigarette, and avoiding the leakage of cigarette liquid due to excessive cigarette liquid at the area of the electric heating wire.

Further, an outer peripheral surface of the atomizing ring 603 elastically abuts against an inner peripheral surface of the atomizing tube 602, thereby preventing the atomizing ring 603 from falling off the atomizing tube 602, thus effectively forming a stable electronic cigarette structure and avoiding the leakage of cigarette liquid towards the battery.

Furthermore, two ends of the fixing tube 604 are inserted to the second electrode assemblies 501 respectively, and the fixing tube 604 is woven from glass fiber strands.

Such arrangement is advantageous in that cigarette liquid can be delivered to the electric heating wire assembly 505 stably through the fixing tube woven with glass fiber strands, thus the electric heating wire assembly 505 can atomize smoke uniformly, avoiding non uniform smoke from being sucked by users and effectively improving the taste of the smoke sucked by users. The fixing tube 604 woven with glass fiber strands also has a good heat-conducting property, which facilitates to dissipate heat from the electric heating wire assembly 505 quickly, thus avoiding the electric heating wire from being scorched and allowing a long service life of the electronic cigarette, and preventing users from sucking into harmful gas generated from the scorched electric heating wire, which protects users' health.

Figure 7:
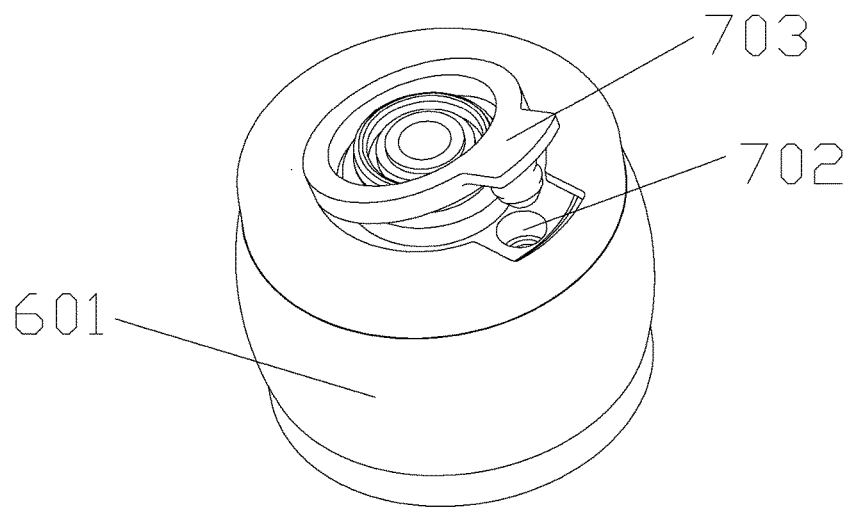
FIG. 7 is a schematic view of the overall structure of the atomizer according to the preferred embodiment of the present application.

Preferably, in order to facilitate users to refill cigarette liquid, as shown in FIG. 7, an end face of an end of the atomizer is provided with a liquid filling port 702 in communication with the liquid storage chamber and a sealing unit 703 configured to seal the liquid filling port 702.

Reference is further made to FIGS. 5 and 7. The liquid filling port 702 may be provided on the outer electrode 502 and passes through the outer electrode 502. A protrusion to be inserted into the liquid filling port 702 is provided on the sealing unit at a position corresponding to the liquid filling port 702, and the protrusion is preferably made of elastic material, such that the protrusion can be in an interference fit with the liquid filling port 702, thus the liquid filling port 702 is sealed by the sealing unit provided with the protrusion, preventing cigarette liquid from leaking out from the liquid filling port 702.

Preferably, as shown in FIGS. 3 and 4, an elastic sealing layer is provided on an inner circumferential wall of the smoke vent 304, such that the smoke vent 304 abuts the water storage smoking device by the elastic sealing layer.

The stabilization of connection between the electronic cigarette and the water storage smoking device can be effectively improved by the smoke vent 304 provided with the elastic sealing layer, thus leakage of cigarette liquid is avoided.

Specifically, multiple elastic protrusions are formed on an inner circumferential wall of the elastic sealing layer at intervals in a direction towards the water storage smoking device, such that the connection between the electronic cigarette and the water storage smoking device become more stable, thus preventing the electronic cigarette from falling off the water storage smoking device.

Preferably, the inner circumferential wall of the elastic sealing layer is provided with a threaded structure, such that the electronic cigarette can be connected to the water storage smoking device by the threaded structure. Apparently, other structures for detachable connection may be provided in the smoke vent 304 for stably connecting the electronic cigarette and the water storage smoking device. The specific structure for detachable connection is not limited in the present embodiment.

In order to allow the smoke atomized by each atomizer 401 to be guided to the smoke vent 304 smoothly, a hollow portion of the fixing tube 604 is in communication with a hollow portion of the second electrode assembly 501 so as to form a smoking passageway for passing through the smoke.

Since any two adjacent atomizers of the atomizers 401 are coaxially arranged sequentially and can be detachably connected through the second electrode assembly 501, the hollow portions of two adjacent second electrode assemblies 501 are communicated sequentially, such that the smoke passageways of individual atomizers 401 are communicated sequentially, and smoke atomized by each of the atomizers can be guided to the smoke vent 304.

Hereinafter, the way of connection between the first housing 101 and the second housing 102 will be described. It should be noted that, the way of connection between the first housing 101 and the second housing 102 in the present embodiment is just illustrated by way of example and not for limitation.

For example, as shown in FIG. 4, a first threaded section 403 is provided with a threaded section 403 on an end face of the first housing 101 facing the second housing 102.

A second threaded section, which is matched with the first threaded section 403, is provided on an inner peripheral surface of an end of the second housing 102 facing the first housing 101, such that the second housing 102 is connected to the first housing 101 through the first threaded section and the second threaded section matched with each other.

Also, for example, a guide groove is provided at an end face of the first housing 101 facing the second housing 102, and a stuck groove is provided to be in communication with the guide groove.

A sliding catch inserted in the guide groove and slidable along the guide groove is provided at the inner peripheral surface of an end of the second housing 102 facing the first housing 101. When the sliding catch slides into the struck groove along the guide groove, the second housing 102 is securely connected to the first housing 101.

A third embodiment is provided, in which an electronic hookah may supply filtered smoke to users so as to prevent cigarette liquid and impurities from being sucked in by users, thereby improving the smoking taste and protecting users' health.

Figure 8:
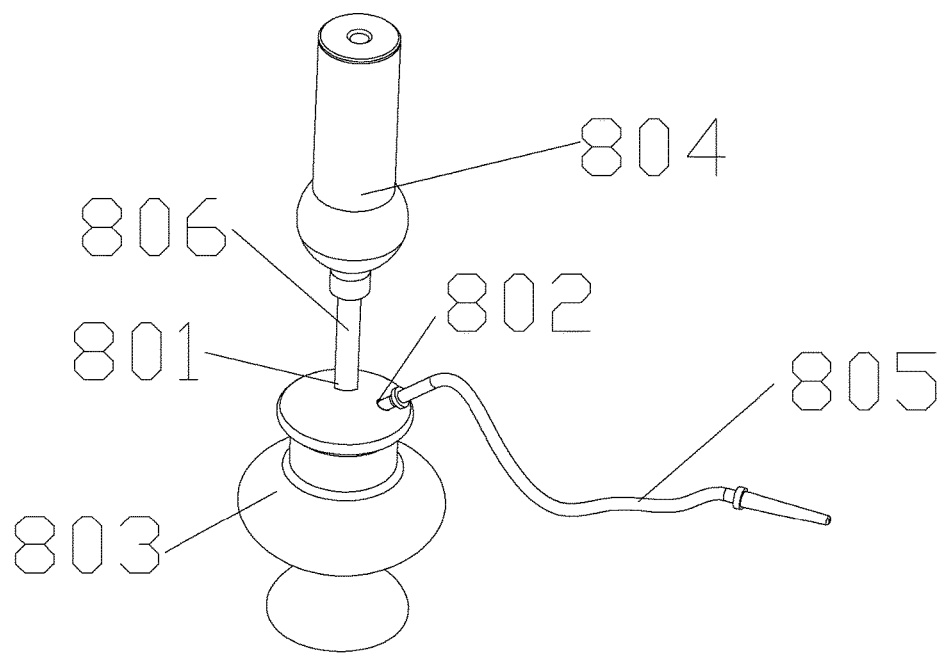
FIG. 8 is a schematic view of the overall structure of a preferred electronic hookah according to the present application.

Reference is made to FIG. 8, the electronic hookah includes a water storage smoking device 803. The water storage smoking device 803 is provided with a smoke inlet 801 and a smoke outlet 802. The water storage smoking device 803 is placed vertically in use and the smoke inlet 801 is located at an upper end of the water storage smoking device 803.

The water storage smoking device 803 is in communication with the smoke vent of the electronic cigarette 804 through the smoke inlet 801. The specific structure of the electronic cigarette is shown in the first and second embodiments. The specific structure of the electronic cigarette in the present embodiment is not limited.

In the normal operation of the electronic hookah, that is, when a user is smoking, smoke generated by the electronic cigarette 804 is discharged from the smoke outlet 802 after being filtered by water in the water storage smoking device 803.

Therefore, for the electronic hookah of the present embodiment, smoke generated by the electronic cigarette 804 can flow into the water storage smoking device 803 through the smoke vent and the smoke outlet 801 in turn, such that the smoke is filtered by water in the water storage smoking device 803, thus cigarette liquid contained in the smoke or impurities such as fine chips possibly generated in the combustion of the wick may also be possibly filtered, thereby the filtered smoke can be sucked in through the smoke outlet 802 by users. In addition, since the water in the water storage smoking device 803 is able to filter the smoke, the temperature of the smoke is reduced, which is similar to the temperature of a traditional hookah, thus improving user experience.

Preferably, a sucking tube 805 is provided for being in communication with the smoke outlet 802 such that the filtered smoke is sucked in through the sucking tube 805 by users.

Preferably, multiple smoke inlets 801 may be provided, and multiple electronic cigarettes 804 may be provided for being connected to the water storage smoking device 803, such that smoke atomized by the multiple electronic cigarettes can be filtered simultaneously by the water storage smoking device 803 so as to further increase the amount of smoke, or users can suck smoke with different tastes simultaneously, thereby making the smoking process of the electronic hookah more colorful.

Preferably, a smoking tube 806 is mounted at the smoke inlet 801 of the water storage smoking device 803, and the smoking tube 806 is inserted in the smoke vent of the electronic cigarette 804, such that the smoking tube 806 is configured to be in communication with the smoke vent.

Preferably, one or more smoke outlet 802 may be provided, that is, if multiple smoke outlets 802 are provided, several users may smoke the electronic hookah simultaneously, which meets the requirement of several users smoking simultaneously, further meeting the requirement of users and improving the experience of users smoking the electronic hookah.

It should be understood by those skilled in the art that for ease of description, the specific operating processes of the system, device and unit described above can refer to the corresponding process in the above embodiments, which is not described here.

The above embodiments are just used for illustrating the technical solution and not for limitation. Although the present application is described in detail with reference to the aforementioned embodiments, it should be understood by those skilled in the art that the technical solutions described in the each of the embodiments can be modified, or some of the technical features can be replaced equivalently. Such modification and replacement do not make the nature of the corresponding technical solution depart from the spirit and scope of technical solution of each of the embodiments of the present application.

The invention claimed is:

1. An electronic cigarette configured to be inserted into and cooperate with a water storage smoking device to atomize cigarette liquid for a user to smoke, comprising: an outer housing, wherein the outer housing comprises a first housing and a second housing detachably connected to the first housing, the cross-sectional area of an end face of the first housing away from the second housing is larger than a cross-sectional area of the second housing;
   a battery and a controller electrically connected to the battery are provided in the first housing, and a first electrode assembly and a light-emitting unit which are electrically connected with the controller are provided at an end of the first housing facing the second housing, and light enters into the second housing and penetrates the second housing to an outer surface of the electronic cigarette when the light-emitting unit is working, and a touch-controlling display module is provided at an end face of the first housing facing away from the second housing, and the touch-controlling display module is electrically connected to the controller for displaying information of the electronic cigarette, which allows users to control the operation of the electronic cigarette;
   a smoke vent, which is inserted into and cooperates with the water storage smoking device, is provided at an end of the second housing away from the first housing, and at least two atomizers, which are arranged coaxially, are detachably inserted into the second housing, and any two adjacent atomizers are connected detachably, and a target atomizer is detachably connected to the first electrode assembly, the target atomizer is one of the atomizers closest to the first battery rod assembly;
   each of the atomizers comprises a liquid storage assembly, a second electrode assembly inserted in either end of the liquid storage assembly and an electric heating wire assembly inserted in the liquid storage assembly for atomizing cigarette liquid in the liquid storage assembly, and the second electrode assembly of the target atomizer is electrically connected to the first electrode assembly, and the electric heating wire assembly is electrically connected to the second electrode assembly of the target atomizer.

2. The electronic cigarette according to claim 1, wherein the liquid storage assembly comprises: a light-transmittable liquid storage cartridge and an atomizing tube inserted in the liquid storage cartridge, and a liquid storage chamber for storing cigarette liquid is enclosed by the liquid storage cartridge, the atomizing tube and the second electrode assembly, and a liquid inlet is provided an end of the atomizing tube away from the first housing at a position where the end is connected to an end wall of the liquid storage chamber, the liquid storage chamber is in communication with an inner chamber of the atomizing tube by the liquid inlet;

the electric heating wire assembly is arranged in the atomizing tube and acquires cigarette liquid from the liquid inlet for atomization.

3. The electronic cigarette according to claim 2, wherein the liquid storage assembly further comprises a fixing tube and an atomizing ring which are inserted in the atomizing tube, a cigarette liquid buffering space is formed between the atomizing ring and the liquid inlet;

the electric heating wire assembly comprises a wick supported on the fixing tube and extending into the cigarette liquid buffering space and an electric heating wire wound on the wick for atomizing cigarette liquid on the wick, and the atomizing ring is sleeved on the atomizing tube and clamps on the wick, an outer peripheral surface of the atomizing ring elastically abuts against an inner peripheral surface of the atomizing tube.

4. The electronic cigarette according to claim 3, wherein two ends of the fixing tube are inserted into the second electrode assembly respectively and the fixing tube is woven from glass fiber strands.

5. The electronic cigarette according to claim 2, wherein a liquid filling port in communication with the liquid storage chamber and a sealing member configured to seal the liquid filling port are provided at an end face of the atomizer.

6. The electronic cigarette according to claim 1, wherein an elastic sealing layer is provided on an inner circumferential wall of the smoke vent, such that the smoke vent abuts against the water storage smoking device by the elastic sealing layer.

7. The electronic cigarette according to claim 6, wherein a plurality of elastic protrusions are formed on an inner circumferential wall of the elastic sealing layer at intervals in a direction towards the water storage smoking device.

8. The electronic cigarette according to claim 6, wherein a threaded structure is formed on the inner circumferential wall of the elastic sealing layer.

9. The electronic cigarette according to claim 3, wherein a hollow portion of the fixing tube is in communication with a hollow portion of the second electrode assembly so as to form a smoke passageway for passing through the smoke; and the smoke passageway is in communication with the smoke vent.

10. The electronic cigarette according to claim 1, wherein a first threaded section is provided on an end face of the first housing facing the second housing; and a second threaded section matched with the first threaded section is provided on an inner peripheral surface of an end of the second housing facing the first housing, such that the second housing is connected to the first housing by the first threaded section and the second threaded section matched with each other.

11. The electronic cigarette according to claim 1, wherein a guide groove is provided at an end face of the first housing facing the second housing, and a stuck groove is provided for being in communication with the guide groove;

a sliding catch inserted in the guide groove and slidable along the guide groove is provided at an inner peripheral surface of the second housing facing the first housing, and if the sliding catch slides into the struck groove along the guide groove, the second housing is securely connected to the first housing.

12. The electronic cigarette according to claim 4, wherein a hollow portion of the fixing tube is in communication with a hollow portion of the second electrode assembly so as to form a smoke passageway for passing through the smoke; and the smoke passageway is in communication with the smoke vent.

13. An electronic hookah, comprising a water storage smoking device having a smoke inlet and a smoke outlet, wherein the water storage smoking device is placed vertically in use and the smoke inlet is located at an upper end of the water storage smoking device, and wherein the electronic hookah further comprises an electronic cigarette configured to be inserted into and cooperate with a water storage smoking device to atomize cigarette liquid for a user to smoke, comprising: an outer housing, wherein the outer housing comprises a first housing and a second housing detachably connected to the first housing, the cross-sectional area of an end face of the first housing away from the second housing is larger than a cross-sectional area of the second housing;

a battery and a controller electrically connected to the battery are provided in the first housing, and a first electrode assembly and a light-emitting unit which are electrically connected with the controller are provided at an end of the first housing facing the second housing, and light enters into the second housing and penetrates the second housing to an outer surface of the electronic cigarette when the light-emitting unit is working, and a touch-controlling display module is provided at an end face of the first housing facing away from the second housing, and the touch-controlling display module is electrically connected to the controller for displaying information of the electronic cigarette, which allows users to control the operation of the electronic cigarette;

a smoke vent, which is inserted into and cooperates with the water storage smoking device, is provided at an end of the second housing away from the first housing, and at least two atomizers, which are arranged coaxially, are detachably inserted into the second housing, and any two adjacent atomizers are connected detachably, and a target atomizer is detachably connected to the first electrode assembly, the target atomizer is one of the atomizers closest to the first battery rod assembly;

each of the atomizers comprises a liquid storage assembly, a second electrode assembly inserted in either end of the liquid storage assembly and an electric heating wire assembly inserted in the liquid storage assembly for atomizing cigarette liquid in the liquid storage assembly, and the second electrode assembly of the target atomizer is electrically connected to the first electrode assembly, and the electric heating wire assembly is electrically connected to the second electrode assembly of the target atomizer, wherein the smoke vent of the electronic cigarette is in communication with the smoke inlet, and when a user is smoking, smoke generated by the electronic cigarette is discharged from the smoke outlet after being filtered by water in the water storage smoking device.

14. The electronic hookah according to claim 13, wherein the liquid storage assembly comprises: a light-transmittable liquid storage cartridge and an atomizing tube inserted in the liquid storage cartridge, and a liquid storage chamber for storing cigarette liquid is enclosed by the liquid storage cartridge, the atomizing tube and the second electrode assembly, and a liquid inlet is provided an end of the atomizing tube away from the first housing at a position where the end is connected to an end wall of the liquid storage chamber, the liquid storage chamber is in communication with an inner chamber of the atomizing tube by the liquid inlet;

the electric heating wire assembly is arranged in the atomizing tube and acquires cigarette liquid from the liquid inlet for atomization.

15. The electronic hookah according to claim 14, wherein the liquid storage assembly further comprises a fixing tube and an atomizing ring which are inserted in the atomizing tube, a cigarette liquid buffering space is formed between the atomizing ring and the liquid inlet;

the electric heating wire assembly comprises a wick supported on the fixing tube and extending into the cigarette liquid buffering space and an electric heating wire wound on the wick for atomizing cigarette liquid on the wick, and the atomizing ring is sleeved on the atomizing tube and clamps on the wick, an outer peripheral surface of the atomizing ring elastically abuts against an inner peripheral surface of the atomizing tube.

16. The electronic hookah according to claim 15, wherein two ends of the fixing tube are inserted into the second electrode assembly respectively and the fixing tube is woven from glass fiber strands.

17. The electronic hookah according to claim 14, wherein a liquid filling port in communication with the liquid storage chamber and a sealing member configured to seal the liquid filling port are provided at an end face of the atomizer.

18. The electronic hookah according to claim 13, wherein a smoking tube is mounted at the smoke inlet of the water storage smoking device, and the smoking tube is inserted in the smoke vent of the electronic cigarette, such that the smoking tube is configured to be in communication with the smoke vent.

19. The electronic hookah according to claim 13, wherein one or more smoke outlet is provided.

20. The electronic hookah according to claim 18, wherein one or more smoke outlet is provided.

* * * * *